(12) United States Patent
Lataille et al.

(10) Patent No.: US 9,031,891 B2
(45) Date of Patent: May 12, 2015

(54) COMPUTING SYSTEM AND METHOD FOR CONTROLLING THE EXECUTION OF A DECISION PROCESS TO MAINTAIN THE DATA ACCESS EFFICIENCY UPON RECEIPT OF AN AVAILABILITY INFORMATION INQUIRY

(71) Applicant: Amadeus S.A.S., Sophia Antipolis (FR)

(72) Inventors: Norbert Lataille, Sophia Antipolis (FR); Renaud Arnoux-Prost, Sophia Antipolis (FR); Alexandre Sbragia, Sophia Antipolis (FR); Eric Bousquet, Sophia Antipolis (FR); David Renaudie, Sophia Antipolis (FR)

(73) Assignee: Amadeus S.A.S., Biot (FR)

( * ) Notice: Subject to any disclaimer, the term of this patent is extended or adjusted under 35 U.S.C. 154(b) by 246 days.

(21) Appl. No.: 13/628,487

(22) Filed: Sep. 27, 2012

(65) Prior Publication Data
US 2014/0089248 A1   Mar. 27, 2014

(51) Int. Cl.
*G06N 7/00*       (2006.01)
*G06Q 10/02*      (2012.01)

(52) U.S. Cl.
CPC ........... *G06Q 10/02* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 5,057,992 A * | 10/1991 | Traiger | ............................ 700/52 |
| 5,839,114 A | 11/1998 | Lynch et al. | |
| 6,490,615 B1 | 12/2002 | Dias et al. | |
| 8,005,968 B2 * | 8/2011 | Mason et al. | .................. 709/228 |
| 2005/0120095 A1 | 6/2005 | Aman et al. | |
| 2007/0055555 A1 | 3/2007 | Baggett et al. | |
| 2008/0098101 A1 | 4/2008 | Black et al. | |
| 2008/0208961 A1 | 8/2008 | Kim et al. | |
| 2009/0222562 A1 | 9/2009 | Liu et al. | |
| 2009/0254707 A1 | 10/2009 | Alstad | |

OTHER PUBLICATIONS

[MAINS-D4.4] EC FP7 MAINS Deliverable D4.4 Lab-trial of GMPLS controlled Ring-Mesh interconnected network, 2012, pp. 1-91.*
European Patent Office, Search Report received in European application No. 12368026.6 dated Feb. 13, 2013.
Aweya, et al., "An adaptive load balancing scheme for web servers", International Journal of Network Management 2002 vol. 12, No. 1, Jan. 1, 2002, pp. 3-39.
European Patent Office, International Search Report and Written Opinion issued in International application No. PCT/EP2013/002897 dated Dec. 4, 2013.

* cited by examiner

*Primary Examiner* — Wilbert L Starks
(74) *Attorney, Agent, or Firm* — Wood, Herron & Evans, LLP

(57) ABSTRACT

Computer-implemented reservation method and system. The method utilized for controlling the execution of a decision process by a computer backend machine of a computer network upon receipt of a computation inquiry includes associating to the computer backend machine a configuration file containing at least a decision rule that drives the decision process and that is computed at least from a current value of a statistical indicator and a target value of the statistical indicator; periodically obtaining an updated value of the statistical indicator; upon detection that the updated value is differing from the target value, dynamically updating the configuration file which further comprises re-computing the decision rule using the updated value as new current value, and storing in real-time the re-computed decision rule in the configuration file.

29 Claims, 6 Drawing Sheets

COMPUTING SYSTEM AND METHOD FOR CONTROLLING THE EXECUTION OF A DECISION PROCESS TO MAINTAIN THE DATA ACCESS EFFICIENCY UPON RECEIPT OF AN AVAILABILITY INFORMATION INQUIRY

TECHNICAL FIELD

The present invention relates generally to data and information processing for computer-implemented database systems and, more particularly, relates to a computer-implemented reservation system and method utilized for providing availability information in a travel reservation and booking system, such as travel seats, in connection with service resources. More precisely, the invention addresses the real-time decision for driving task executions by a source of data; for instance, choosing one among a plurality of data sources storing availability information data relevant to the availability requests and using inventory links to their optimal capacity, and thus providing a high availability service while using data sources of a lower reliability. In addition, the invention can also reduce failures in retrieving data from a data source and dynamically monitor and maintain the high efficiency of data access to an availability cache source when a data sync process is being executed.

BACKGROUND

A computerized travel system is organized around a Global Distribution System GDS being accessed by travel vendors such as travel agencies, online travel vendors and travel companies. The GDS system may be proprietary computer systems allowing real-time access to airline fares, schedules, and seating availability and other data.

The GDS system implements an access to various data sources in order to provide availability information. To retrieve availability information, the inventory source can be accessed by polling while other data sources are accessible in parallel in order to reduce the polling bandwidth, save costs (inventory database's accesses are more expensive) and cut off response time as often as possible.

A challenge is to quickly react to a rapid variation such as a growth of computation inquiries or a crisis (like a polling outage) and meanwhile to maintain the data access efficiency of data sources. It leads to technical constraints involving routing decisions between various sources where data relevant to reply to an availability request are potentially stored. System must then decide in which case it is more appropriate to use an AVS (availability status source) or a cache data source.

SUMMARY

In one example of embodiment, a method is disclosed for controlling the execution of a decision process by a computer backend machine of a computer network upon receipt of a computation inquiry, comprising:
- associating to the computer backend machine a configuration file containing at least a decision rule that drives the decision process and that is computed at least from a current value of a statistical indicator and a target value of the statistical indicator;
- periodically obtaining an updated value of the statistical indicator;
- upon detection that the updated value is differing from the target value, dynamically updating the configuration file which further comprises:
    - re-computing the decision rule using the updated value as new current value;
    - storing in real-time the re-computed decision rule in the configuration file.

In another example of embodiment, a computerized system comprises at least one computer backend machine conured to execute a decision process upon receipt of a computation inquiry and comprising a configuration file containing at least a decision rule that drives the decision process and that is computed at least from a current value of a statistical indicator and a target value of the statistical indicator, the computer backend machine comprising a processor where operation of the processor in accordance with a computer program stored in a computer-readable medium causes the computerized system to:
- periodically obtaining an updated value of the statistical indicator;
- upon detection that the updated value is differing from the target value, dynamically updating the configuration file which further comprises:
    - re-computing the decision rule using the updated value as new current value;
    - storing in real-time the re-computed decision rule in the configuration file.

Potential advantages of the present invention are:
Maintaining a high quality of service by choosing an appropriate target data source from several data sources including relatively low-reliable ones;
Optimally using the data sources and their storage capacity;
Following and maintaining the contractual agreements, such as Service Level Agreements (SLA).

The exemplary embodiments also encompass a computer-readable medium that contains software program instructions, where execution of the software program instructions by at least one data processor results in performance of operations that comprise execution of the method of the present invention.

BRIEF DESCRIPTION OF THE DRAWINGS

The foregoing and other aspects of the embodiments of the present invention are made more evident in the following Detailed Description, when read in conjunction with the attached Figures, wherein.

DETAILED DESCRIPTION

Although the following description is given in the context of an application to the airline industry, it does not represent a limiting example since the present invention is applicable to all sorts of travel and tourism products such as rooms, car rental, railways tickets or the like.

Before the introduction of the present invention, certain terms used in the following description are defined as follows:

Availability: This is the number of seats available for sale. It is used to accept or deny further bookings.

Sources of availability information: this comprises all kinds of data repositories where information connected to travel product availability are stored.

Inventory source: a source of availability information which has the best accuracy since it reflects the actual status of the bookings made for travel products the inventory is comprised of. In typical cases, the inventory is based at the travel carrier side.

Base availability source: a source of availability information which derives from the inventory source. It is often used at a GDS system side to prevent systematic access to the inventory source and save bandwidth consumption. Such data source type, also called AVS is periodically updated from the inventory source and is a simplified version of the inventory source. In term of data quality, the data sources rated according to a high, fair, or low confidence level are respectively listed as follows: the inventory source, the availability cache source and the AVS.

Availability cache source: a source of availability information usually of lower confidence than the inventory source but with lower usage cost. Such caches may be fed with results obtained from past availability requests. A first user request and the corresponding reply can thus be re-used in response to another request. In some cases the cache is first built from responses to pro-active requests, i.e.: requests automatically created at server side.

Polling: a query sent to the inventory source for replying to a user request.

Figure 1:
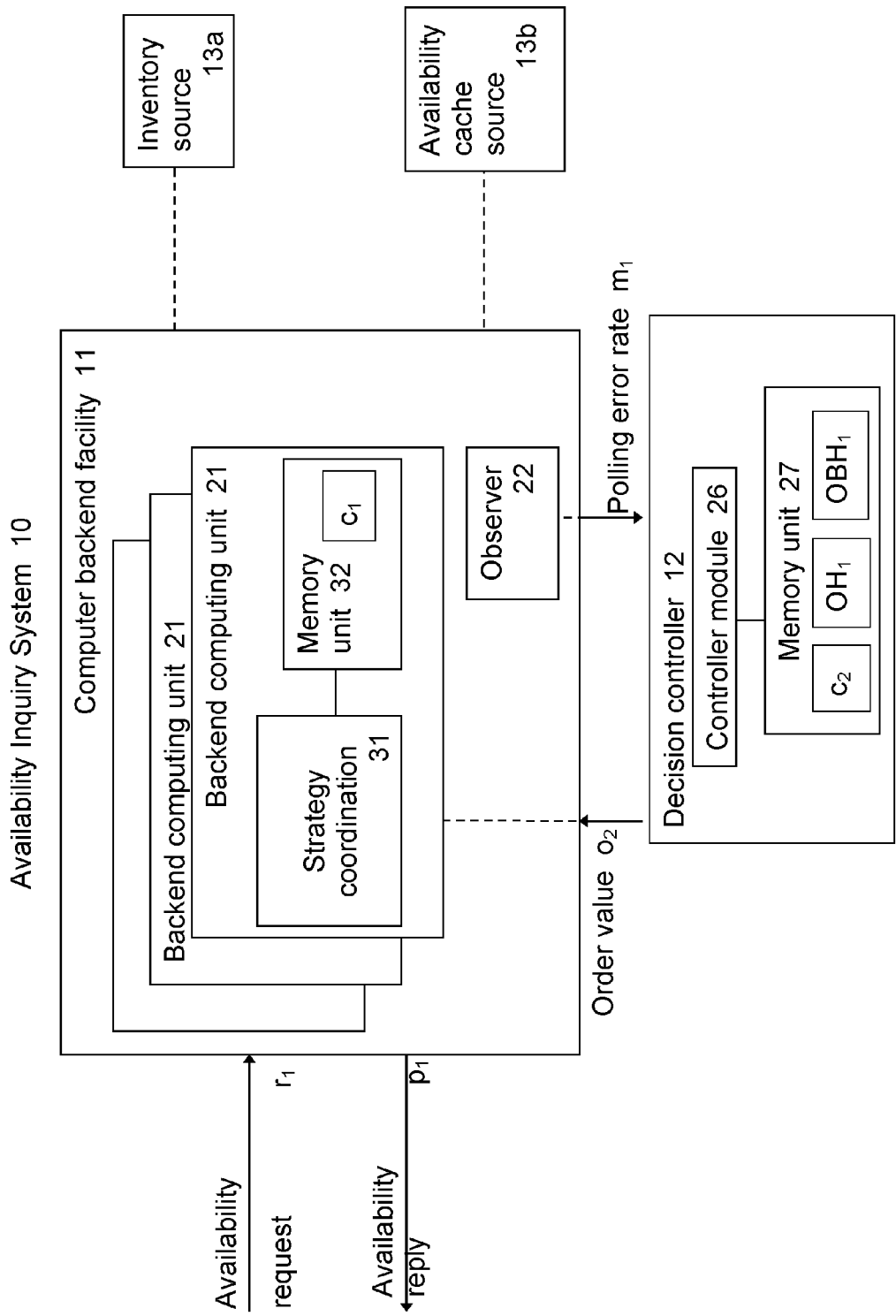
FIG. 1 is an example of an architecture diagram of an availability inquiry system according to a first non limiting embodiment of the present invention.
Figure 2:
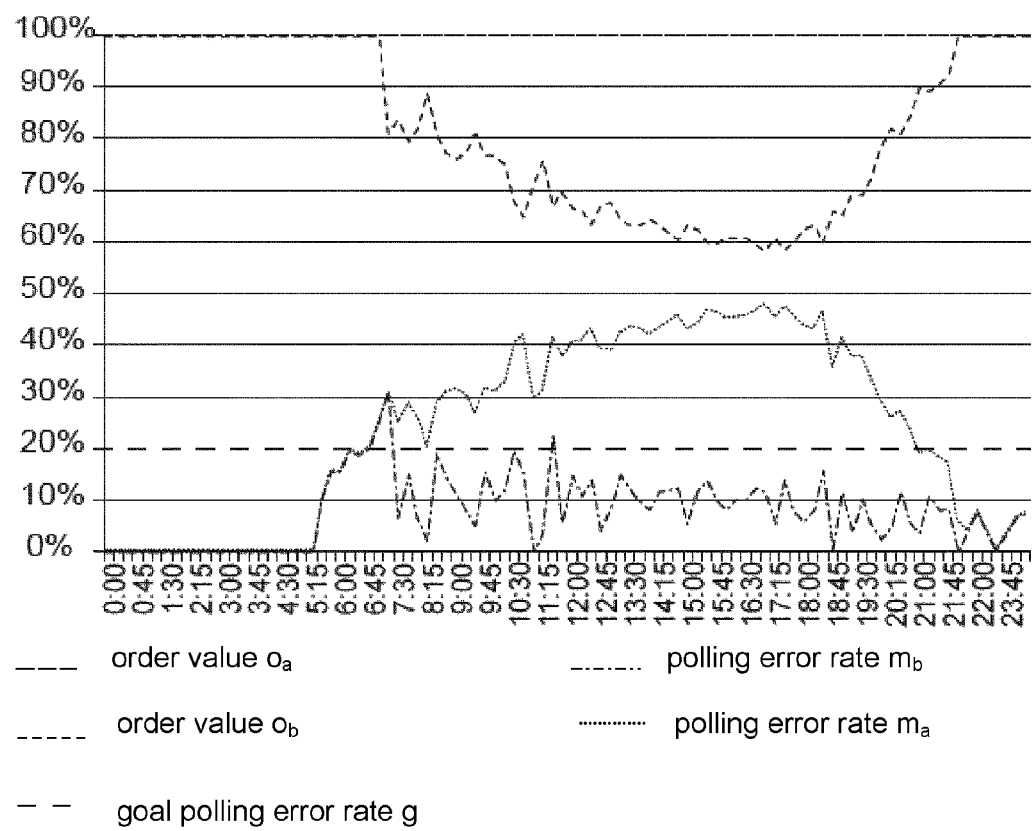
FIG. 2 is a linear graph presenting the values of polling error rates $m_a$ and $m_b$, a polling error threshold rate g, and order values $o_a$ and $o_b$.

FIGS. 1 and 2 give an example of a first embodiment of the invention. In the embodiment, a polling error rate of an inventory source is monitored and utilized to drive a decision process on how to use the inventory source. Further embodiments of the invention are depicted in FIG. 3 through 6. The embodiments can be combined with each other.

FIG. 1 is an example of an architecture block diagram of an availability inquiry system 10 according to the present invention. In the present embodiment, after receiving a computation inquiry, which is here an availability request $r_1$, the availability inquiry system 10 can dynamically choose one from at least two data sources and retrieve the corresponding data from the chosen data source by applying a data source adaptation method to compute a decision rule. The data source adaptation method requires a polling error rate of an inventory source as an input data. The polling error rate represents a ratio between a number of access failures and a number of access attempts to a given data source. It is used as a statistical indicator.

The availability inquiry system 10 comprises a computer backend facility 11, a decision controller 12, and two data sources, an inventory source 13a and an availability cache source 13b, respectively, such data sources are purely indicative and the invention applies to any data sources. In the present embodiment, the given data source is the inventory source 13a. All data sources are utilized for providing a storage space to (at least temporarily) store data relating to the seat availability. The computer backend facility 11 can be implemented by a computer cluster consisting of a set of loosely connected computers, or only by a single computing device. In the present embodiment, the computer backend facility 11 is coupled to the decision controller 12 and the data sources 13a and 13b, respectively.

The computer backend facility 11 is utilized for executing a decision process upon receipt of an availability request $r_1$. It comprises at least one backend computing unit 21 and an observer 22. The observer 22 is utilized for periodically generating and sending a latest polling error rate $m_1$ to the decision controller 12. The polling error rate $m_1$ is a ratio between a number of failures in retrieving data from the inventory source 13a and a total number of access attempts to the said inventory source 13a. It thus reflects the access efficiency performed for the inventory source 13a.

The backend computing unit 21 comprises a strategy coordinator 31 and a memory unit 32. The memory unit 32 is coupled to the strategy coordinator 31. The memory unit 32 is utilized for storing at least a configuration file $c_1$ containing at least a decision rule. The strategy coordinator 31 is utilized for executing the decision rule.

The decision controller 12 comprises a controller module 26 and a controller memory unit 27. The controller module 26, coupled to the memory unit 27, is utilized for generating an order value $o_2$ which is between 0% and 100%. An order value, for example the order value $o_2$, is defined as an access attempt rate to the inventory source 13a. The memory unit 27 stores at least a configuration file $c_2$, an order history file $OH_1$ and an observation history file $OBH_1$. The configuration file $c_2$ contains a polling error threshold rate g, that is the highest acceptable inventory access failure rate, predefined by the system administrator for example; in the present embodiment, the polling error threshold rate g is set to be 20%. In addition, the decision controller 12 gathers the updated values of the polling error rate $m_1$ at regular intervals preferably of a length under 5 minutes.

It should be noted that in other embodiments, the configuration files $c_1$ and $c_2$, the order history file $OH_1$ and the observation history file $OBH_1$ can be stored in a same memory unit, or in different memory units other than the memory unit 32 or the memory unit 27. Also the decision controller 12 and the computer backend facility 11 may share some hardware and/or software resources.

The computer backend facility 11 executes a decision process in order to reach (but not exceed) the order value $o_2$, and switches from the inventory source 13a (the main data source) to the availability cache source 13b in order to keep the polling error rate of the inventory source 13a not greater than the polling error threshold rate g.

The decision process requires data computed by the decision controller 12. The controller module 26 determines the order value $o_2$ according to information provided by the observer 22, the configuration $c_2$ and the observation history file $OBH_1$ stored in the memory unit 27. The detailed description about the data source adaptation method will be included in the following paragraphs.

The decision controller 12 is utilized for computing the updated order value $o_2$ related to the inventory source 13a. It periodically obtains the updated polling error rate $m_1$ provided by the observer 22, and the previous order value $o_1$ stored in the observation history file $OBH_1$. It then detects a difference between the polling error rate $m_1$ and the polling error threshold rate g provided by the configuration file $c_2$. The decision controller 12 generates the order value $o_2$ by applying a first response function which will be presented in the following paragraphs.

There are three cases of the value comparison between the polling error rate $m_1$ and the polling error threshold rate g:

- The polling error rate $m_1$ is equal to the polling error threshold rate g: The computer backend facility 11 remains to access to the inventory source 13a as before and doesn't need to change the order value that will be applied to decision rules.
- The polling error rate $m_1$ is smaller than the polling error threshold rate g: It means that the number of data retrieving requests received by the inventory source 13a is less than its maximum capacity of access. The computer backend facility 11 can more access to the inventory source 13a. The updated order value $o_2$ is greater than the previous order value $o_1$.
- The polling error rate $m_1$ is bigger than the polling error threshold rate g: It means that the number of data retrieving requests received by the inventory source 13a is already greater than its maximum capacity of access. The updated order value $o_2$ is less than the previous order value $o_1$.

As mentioned above, the controller module 26 generates the order value $o_2$ by applying the first response function which calculates on the previous order value $o_1$, the polling error threshold rate g, the history of order values (recorded in $OH_1$) and the history of observations (recorded in $OBH_1$). The first response function can be presented as, but not limited to, the following example formula: $o_2 = o_1 \times e^{(g - m_1)}$.

The order value $o_2$ is then regulated if one of the following conditions occurs:

- If the updated order value $o_2$ is greater than 100%, the updated order value $o_2$ is set to be 100%.
- If the updated order value $o_2$ is smaller than a predefined minimum order value, the updated order value $o_2$ is set to be the minimum order value stored in the configuration file $c_2$.

The controller module 26 stores the order value $o_2$ to the order history file $OH_1$, which will become the new value of the order value $o_1$ utilized in the next computation.

After receiving the updated order value $o_2$, the backend computing unit 21 re-computes the decision rule, including a data source selection rule for determining the data source among the inventory source 13a and the availability cache source 13b for retrieving data to be used for the availability request $r_1$. In all embodiments, the data source selection rule may be also a function of at least one characteristic of an availability request, such as the originator of the availability request or a parameter of the availability request, such as a market (it can be a journey origin and/or a destination, or the airline code of the provider in the travel industry.)

The detailed description about updating the data source selection rule given the updated order value $o_2$ is provided as follows:

- If the updated order value $o_2$ is greater than the previous order value $o_1$, the data source selection rule is updated with a higher level of access, based on the rules stored in the configuration file $c_1$. Said stored rules will take the updated order value $o_2$ and some characteristics of the request $r_1$ (eg: airline, product) which will be sent to the chosen data source to use.
- If the updated order value $o_2$ is smaller than the previous order value $o_1$, it means the inventory source 13a previously got too many data retrieving requests, relative to its maximum capacity of access. The computer backend facility 11 needs to lower down the order value from the value $o_1$ to the value $o_2$ to reduce the polling error rate of the inventory 13a and the data source selection rule is updated with a lower level of access. If the updated order value $o_2$ lowers and is close to 0, the computer backend facility 11 will be guided by the data source selection rule and thus switch to retrieve data from the availability cache source 13b to process the largest part of the requests.

After obtaining necessary data retrieved from the chosen data source, the computer backend facility 11 generates an availability reply $p_1$ corresponding to the availability request $r_1$.

The above re-computed decision rule is stored in real-time in the configuration file $c_1$. The updating of the configuration file $c_1$ can be executed independently from applying the configuration file $c_1$ for any availability requests received by the computer backend facility 11. Furthermore, it should be noted that in other embodiments, in addition to the inventory source 13a and the availability cache source 13b, the availability inquiry system 10 may comprise more than two data sources, such as an AVS source. In this case, if the availability cache source is selected but it is empty or it does not answer in time, the AVS source will be selected. In addition, there can be a plurality of polling sources selected among a dynamic availability polling source, a direct access polling source and an availability calculator source.

Turning now to FIG. 2, FIG. 2 is a linear graph presenting the values of polling error rates $m_a$ and $m_b$, a polling error threshold rate g, and order values $o_a$ and $o_b$. The polling error rate $m_a$ and the order value $o_a$ are recorded before the execution of the data source adaptation method. The polling error rate $m_b$ and the order value $o_b$ are recorded during the execution of the data source adaptation method according to the present invention.

During the observation period, by executing the data source adaptation method, the availability inquiry system 10 efficiently reduces the polling error rate of the inventory source 13a from the value $m_a$ to the value $m_b$, which steadily approximates to the polling error threshold rate g. In addition, the order value performed for the inventory source 13a is reduced from the value $o_a$ to the value $o_b$ because the availability inquiry system 10 adjusts in real-time the number of access attempts to the inventory source 13a by dynamically computing the order value of the inventory source 13a when receiving new observations.

Figure 3:
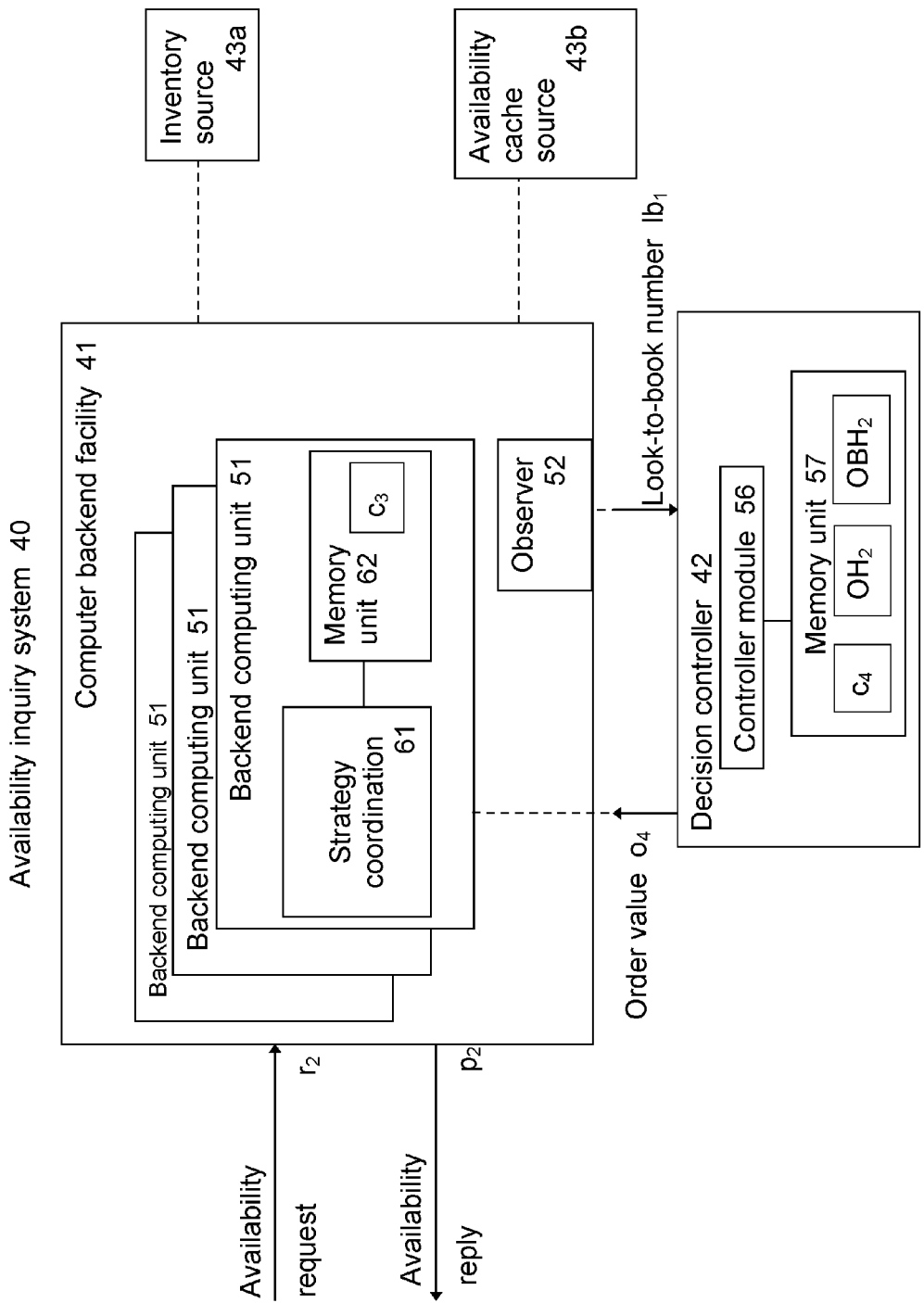
FIG. 3 is an example of an architecture block diagram of a reservation system 40 according to a second non limiting embodiment of the present invention.

FIG. 3 shows another embodiment where look-to-book considerations are used to drive the decision process. FIG. 3 is an example of an architecture block diagram of a reservation system 40 according to the present invention. The structure of the reservation system 40 and its functions are similar to those of the above-mentioned availability inquiry system 10 of the above-mentioned embodiment. However, the decision process executed by the reservation system 40 requires a look-to-book number as an input data to be used as a statistical indicator. While retrieving data from an inventory source 43a, the look-to-book number indicates the average number of availability requests received by the reservation system 40 involving an access to a given data source for making a conversion into a booking (eg, a seat reservation). An example of 700 "looks" for 1 "book" is used below.

In the present embodiment, after receiving an availability request $r_2$, the reservation system 40 can dynamically choose one from at least two data sources and retrieve the corresponding data from the chosen data source by applying a data source adaptation method to compute a decision process.

The reservation system 40 comprises a computer backend facility 41, a decision controller 42, and two data sources, an inventory source 43a and an availability cache source 43b, respectively, such data sources are purely indicative and the invention applies to any data source. In the present embodiment, the given data source is the inventory source 43a. The computer backend facility 41 is coupled to the decision controller 42 and the data sources 43a and 43b, respectively.

The computer backend facility 41 is utilized for executing a decision process upon receipt of an availability request $r_2$. It comprises at least one backend computing unit and an observer 52. The observer 52 is utilized for periodically generating and sending a latest look-to-book number $lb_1$ to the decision controller 42. The smaller the look-to-book number $lb_1$ is, the more orders can be processed while retrieving the corresponding data from the inventory source 43a, keeping a given inventory source usage efficiency. A small look-to-book number reflects a good efficiency of the inventory source since its access rate is low compared to the conversion of availability requests into bookings. (A look-to-book conversion rate takes into account only the looks to the inventory source 43a against the bookings made by the reservation system 40.)

The backend computing unit 51 comprises a strategy coordinator 61 and a memory unit 62. The memory unit 62 is coupled to the strategy coordinator 61. The memory unit 62 is utilized for storing at least a configuration file $c_3$ containing at least a decision rule. The strategy coordinator 61 is utilized for executing the decision rule.

The decision controller 42 comprises a controller module 56 and a controller memory unit 57. The controller module 56, coupled to the memory unit 57, is utilized for generating an order value $o_4$, which is between 0% and 100%. An order value, for example the order value $o_4$, is defined as an access attempt rate to the inventory source 43a. The decision controller 42 generates the order value $o_4$ by applying a second response function which will be presented in the following paragraphs.

The memory unit 57 stores at least a configuration file $c_4$, an order history file $OH_2$ and an observation history file $OBH_2$. The configuration file $c_4$ contains a goal look-to-book number lbg set by the system administrator to be 700 for example, and a look-to-book conversion rate is thus 700:1 in the present embodiment. In addition, the decision controller 42 gathers the updated values of the look-to-book number $lb_1$ at regular intervals of a length under 5 minutes, and computes a global look-to-book conversion rate which is computed as an integration since a given point in time, for example, the start of a day.

It should be noted that in other embodiments, the configuration files $c_3$ and $c_4$, the order history file $OH_2$ and the observation history file $OBH_2$ can be stored in a same memory unit, or in different memory units other than the memory unit 62 or the memory unit 57.

The computer backend facility 41 executes a decision process in order to decide the order value $o_4$, and switch from the inventory source 43a (the main data source) to the availability cache source 43b if the incoming availability requests in order to keep the look-to-book number corresponding to the inventory source 43a not greater than the goal look-to-book number lbg.

The decision process requires data computed by the decision controller 42. The controller module 56 determines the order value $o_4$ according to information provided by the observer 52, the configuration $c_4$ and the observation history file $OBH_2$ stored in the memory unit 57. The detailed description about the data source adaptation method will be included in the following paragraphs.

The decision controller 42 is utilized for computing the updated order value $o_4$ related to the inventory source 43a. It periodically obtains the updated look-to-book number $lb_1$ provided by the observer 52, and the previous order value $o_3$ stored in the order history file $OH_2$. It then detects a difference between the look-to-book number $lb_1$ and the goal look-to-book number lbg provided by the configuration file $c_4$.

There are three cases of the value comparison between the look-to-book number $lb_1$ and the goal look-to-book number lbg:

The look-to-book number $lb_1$ is equal to the goal look-to-book number lbg: The computer backend facility 41 remains to access as before to the inventory source 43a and doesn't need to change the order value that will be applied to decision rules. However, if more orders are to be made, the computer backend facility 41 switches to access to the availability cache source 43b for retrieving data.

The look-to-book number $lb_1$ is smaller than the goal look-to-book number lbg:
The computer backend facility 41 can thus continue accessing to the inventory source 43a for retrieving data. The updated order value $o_4$ is greater than the previous order value $o_3$.

The look-to-book number $lb_1$ is bigger than the goal look-to-book number lbg:
It means that currently for making a conversion into a booking, the inventory source 43a already receives too many data retrieving requests. The computer backend facility 41 switches thus more frequently to access to the availability cache source 43b for retrieving data. The updated order value $o_4$ is less than the previous order value $o_3$.

As mentioned above, The controller module 56 generates the updated order value $o_4$ by applying the second response function which calculates on the previous order value $o_3$, the goal look-to-book number lbg, the history of order values (recorded in $OH_2$) and the history of observations (recorded in $OBH_2$). The second response function can be presented as, but not limited to, the following example formula: $o_4 = o_3 \times e^{(lbr_1 - lgbr)}$, wherein the variable lgbr is a ratio calculated based on the goal look-to-book number lbg while the variable $lbr_1$ is a ratio calculated based on the look-to-book number $lb_1$.

Like the order value $o_2$ of the availability inquiry system 10, the order value $o_4$ is then regulated if one of the following conditions occurs:
If the updated order value $o_4$ is greater than 100%, the updated order value $o_4$ is set to be 100%.
If the updated order value $o_4$ is smaller than a predefined minimum order value, the updated order value $o_4$ is set to be the minimum order value stored in the configuration file $c_1$.

The controller module 56 stores the order value $o_4$ to the order history file $OH_2$, which will become the new value of the order value $o_3$ utilized in the next computation.

After receiving the updated order value $o_4$, the backend computing unit 21 re-computes the decision rule, including a data source selection rule for determining the data source among the inventory source 43a and the availability cache source 43b for retrieving data to be used for the availability request $r_2$. The data source selection rule may also be a function of at least one characteristic of an availability request.

After obtaining necessary data retrieved from the chosen data source, the computer backend facility 41 generates an availability reply $p_2$ corresponding to the availability request $r_2$.

The above re-computed decision rule is stored in real-time in the configuration file $c_3$. The updating of the configuration file $c_3$ can be executed independently from applying the configuration file $c_3$ for any availability requests received by the computer backend facility 41. Furthermore, it should be noted that in other embodiments, in addition to the inventory source 43a and the availability cache source 43b, the reservation system 40 may comprise more than two data sources, such as an availability status source. In addition, there can be a plurality of polling sources selected among a dynamic availability polling source, a direct access polling source and an availability calculator source.

Figure 4:
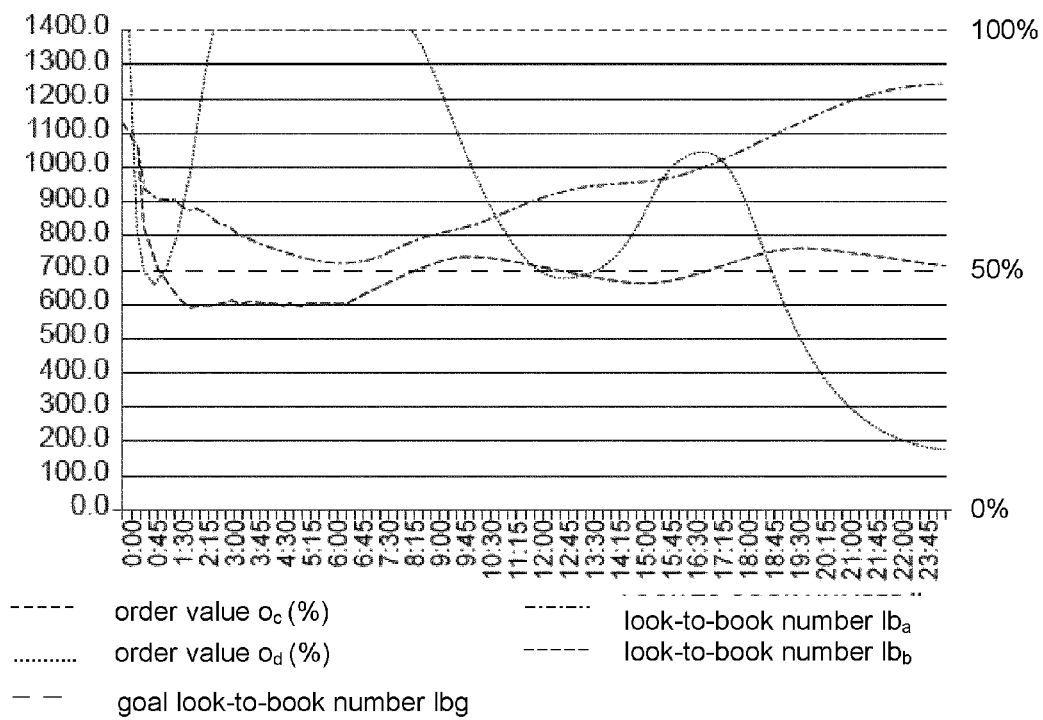
FIG. 4 is a linear graph presenting the values of look-to-book numbers $lb_a$ and $lb_b$, a goal look-to-book number lbg, and order values $o_c$ and $o_d$.

FIG. 4 is a linear graph presenting the values of look-to-book numbers $lb_a$ and $lb_b$, a goal look-to-book number lbg, and order values $o_b$ and $o_d$. The look-to-book number $lb_a$ and the order value $o_c$ are recorded without the execution of the data source adaptation method. The look-to-book number $lb_b$ and the order value $o_d$ are recorded with the execution of the data source adaptation method according to the present invention.

By executing the data source selection rule update process according to the present invention, the reservation system 40 makes the look-to-book number corresponding to the inventory source 43a approximate to the goal look-to-book number lbg at the end of each aggregation period, such as a daily integration), in order to adjust in real-time the number of access attempts to retrieving data from the inventory source 43a.

Figure 5:
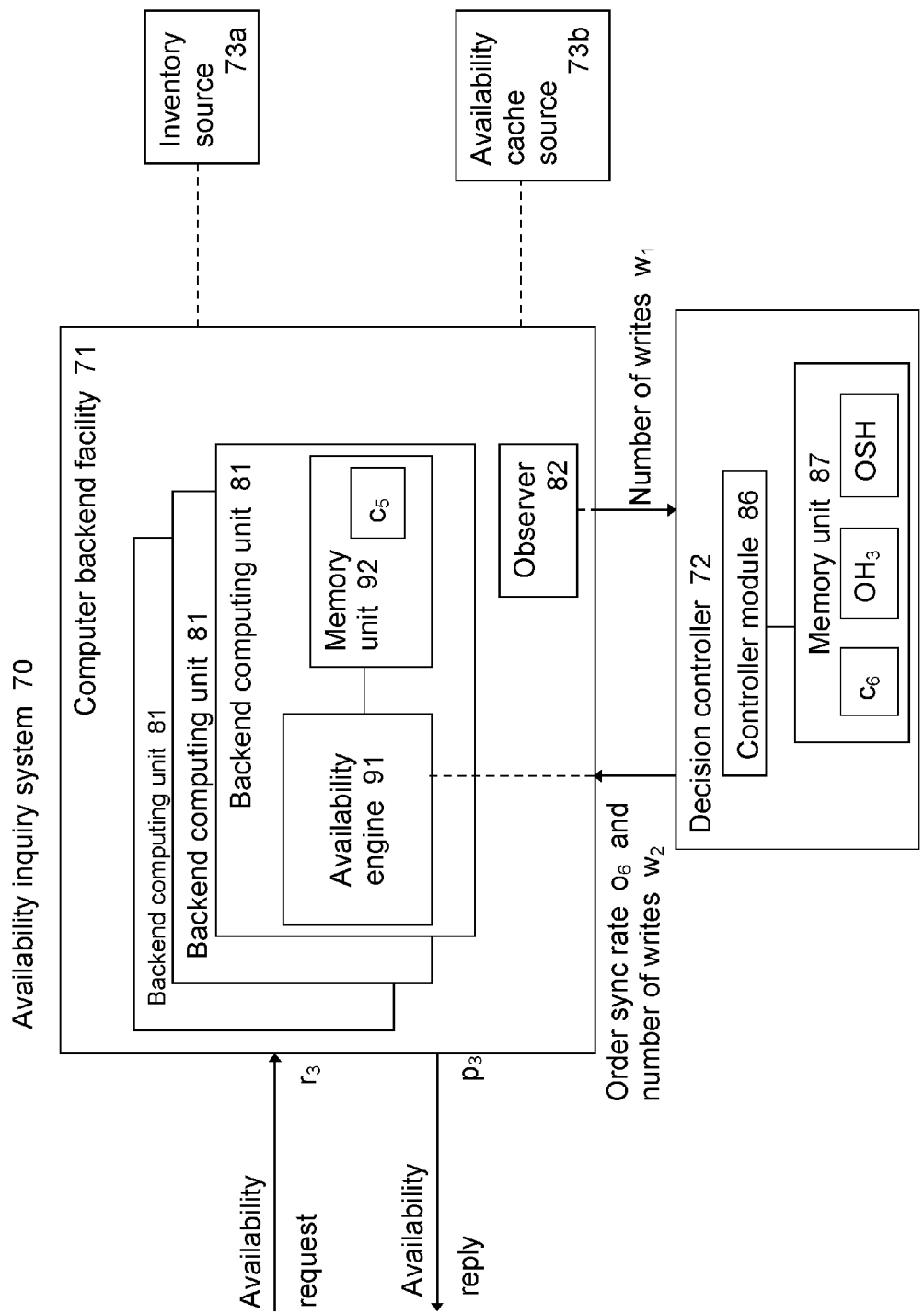
FIG. 5 is an example of an architecture block diagram of an availability inquiry system 70 according a third non limiting embodiment of the present invention.

FIG. 5 is an example of an architecture block diagram of an availability inquiry system 70 according to the present invention. In the present embodiment, after receiving an availability request $r_3$, the availability inquiry system 70 retrieves availability data from at least two data sources to generate an availability reply $p_3$ corresponding to the availability request $r_3$. It further executes a data sync method to keep the data consistency among the data sources, one of which is here an availability cache source 73b. The decision process requires a number of writes $w_1$ of the availability cache source 73b as an input data, which is used as a statistical indicator.

The availability inquiry system 70 comprises a computer backend facility 71, a decision controller 72, and two data sources, an inventory source 73a and a cache database 73b, respectively, such data sources are purely indicative and the invention applies to any data sources. The computer backend facility 71 is coupled to the decision controller 72 and the data sources 73a and 73b, respectively.

The computer backend facility 71 is utilized for executing a data sync method to update data stored in the availability cache source 73b. It comprises at least one backend computing unit and an observer 82. The observer 82 is utilized for periodically sending a latest number of writes $w_1$, performed for the availability cache source 73b, to the decision controller 72. The detailed description about the data sync method will be included in the following paragraphs.

The backend computing unit 81 comprises an availability engine 91 and a memory unit 92. The memory unit 92 is coupled to the availability engine 91. The memory unit 92 is utilized for storing at least a configuration file $c_5$ containing at least a decision rule. The availability engine 91 is utilized for executing the decision rule with applying an order sync rate $o_6$, which represents a percentage of updated availability data to be replicated from the inventory source 73a to the availability cache source 73b.

The decision controller 72 comprises a controller module 86 and a controller memory unit 87. The controller module 86, coupled to the memory unit 87, is utilized for generating the order sync rate $o_6$. The memory unit 87 stores at least a configuration file $c_6$, an order history file $OH_3$ and an observation history file $OBH_3$. The configuration file $c_6$ contains a goal number of writes wg set by the system administrator, for instance, a maximum capacity of access to the availability cache source 73b; in the present embodiment, the goal number of writes wg is set to be 500000. In addition, the decision controller 72 gathers the updated values of the number of writes $w_1$ at regular intervals preferably of a length under 5 minutes.

It should be noted that in other embodiments, the configuration files $c_5$ and $c_6$, the order sync history file OSH and the observation history file $OBH_3$ can be stored in a same memory unit, or in different memory units other than the memory unit 92 or the memory unit 87. Also the decision controller 72 and the computer backend facility 71 may share some hardware and/or software resources.

The computer backend facility 71 executes a decision process in order to reach (but not exceed) the order sync rate $o_6$. The decision process requires data computed by the decision controller 72. The decision controller 72 is utilized for computing the order sync rate $o_6$. It periodically obtains the updated number of writes $w_1$ provided by the observer 82, and the previous order sync rate $o_5$ stored in the order sync history file OSH. It then detects a difference between the number of writes $w_1$ and the goal number of writes wg provided by the configuration file $c_6$.

The controller module 86 generates the updated order sync rate $o_6$ based on a third response function which calculates on the goal number of writes wg and the number of writes $w_1$, and stores the order sync rate $o_6$ to the order sync history file OSH. The third response function is presented as, but not limited to, the following formula: $o_6=wg/w_1$. The controller module 86 also provides the order sync rate $o_6$ to the computer backend facility 71 to ensure that the availability cache source 73b will not exceed its maximum capacity of access.

There are three cases of the value comparison between the number of writes $w_1$ and the goal number of writes wg:

The number of writes $w_1$ is equal to the goal number of writes wg: The computer backend facility 71 remains the same sync rate $o_6$ to replicate updated availability data from the inventory source 73a to the availability cache source 73b. The number of writes $w_2$ is set to be the value of the goal number of writes wg.

The number of writes $w_1$ is bigger than the goal number of writes wg: The number of writes performed for the availability cache source 73b may be greater than its maximum capacity of access. It means that the computer backend facility 71 need to reduce data replication writes from the inventory source 73a to the availability cache source 73b. The number of writes $w_2$ is set to be the value of the goal number of writes wg.

The number of writes $w_1$ is smaller than the goal number of writes wg: It means that the computer backend facility 71 can perform more data replication writes from the inventory source 73a to the availability cache source 73b. The number of writes $w_2$ is set to be the value of the number of writes $w_1$.

After receiving the updated order sync rate $o_6$, the computer backend facility 71 recomputes the decision rule, including a cache write throttling rule.

Figure 6:
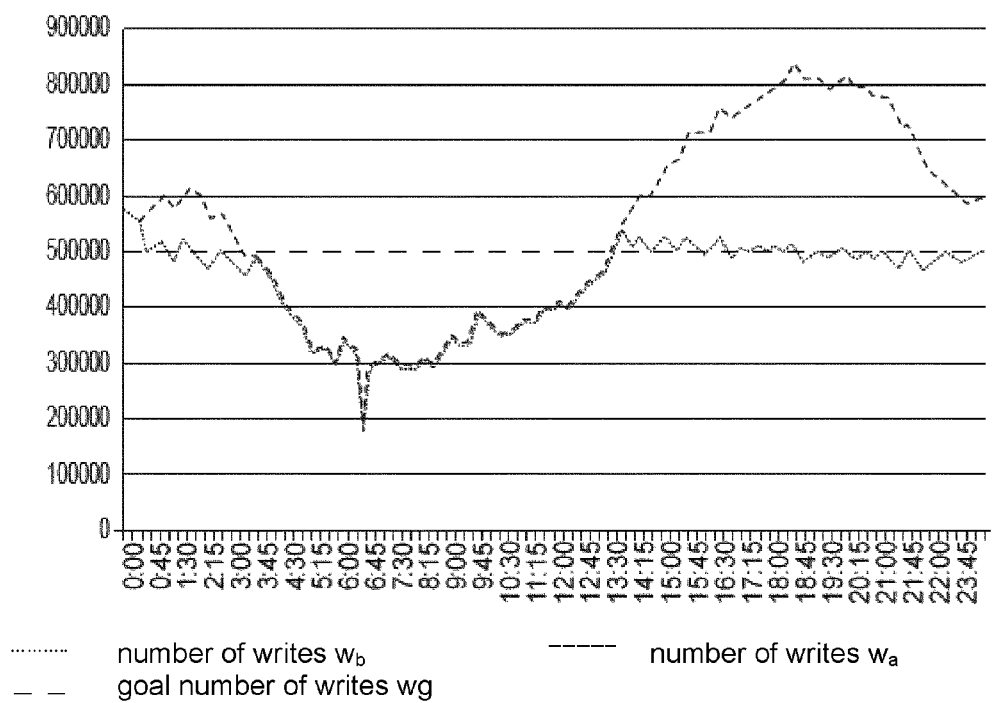
FIG. 6 is a linear graph presenting the values of numbers of writes $w_a$ and $w_b$, and a goal number of writes wg.

Turning now to FIG. 6, FIG. 6 is a linear graph presenting the values of numbers of writes $w_a$ and $w_b$, and a maximum number of writes wg. The number of writes $w_a$ is recorded without the execution of the data sync method. The number of writes $w_b$ is recorded with the execution of the data sync method according to the present invention. In addition, during the observation period, by executing the data sync method, the availability inquiry system 70 efficiently reduces the write overload of the availability cache source 73b.

Exemplary embodiments of the invention are summarized hereafter; they can each be used independently or in combination with at least another exemplary embodiment of the invention:

The invention comprises using the configuration file for any computation inquiry received by the computer backend machine independently from the updating of the configuration file.

The at least one decision rule comprises data source selection rule providing a logic conured to determine a data source among plural data sources accessible for retrieving data to be used for the computation inquiry.

The data source selection rule is a function of at least one characteristic of the computation inquiry.

The computation inquiry is a flight availability computation inquiry, and where the data source selection rule is an availability data source selection rule, and where the plural data sources comprise at least two of: a polling source, an availability status source (AVS), an availability cache source.

The plural data sources comprise at least one polling source selected among a dynamic availability polling source, a direct access polling source and an availability calculator source, and comprising using, as statistical indicator for determining the availability data source selection rule, a ratio between a number of failures in retrieving data from the polling source and a total number of access attempts to said polling source.

The plural data sources comprise at least one polling source selected among a dynamic polling source, a direct access polling source and an availability calculator source, the method comprising using, as statistical indicator for determining the availability data source selection rule, a look-to-book ratio of an originator of the computation inquiry.

The at least one decision rule comprises a cache writing decision rule providing a logic of whether to write in an availability cache source a replication of data obtained from a remote data source such as an inventory source also called polling source.

The cache writing decision rule is a function of at least one characteristic of the computation inquiry.

The invention comprises using a number of cache writings as statistical indicator for determining the cache writing decision rule.

The computation inquiry requires the execution of a data read or write instruction in a data source and where the decision process is for deciding on whether a given data source is to be accessed by the computer backend machine for the execution of the data read or write instruction.

The invention comprises: 1) defining an order level of read or write instructions to be executed by the given data source; this order level may be a proportion of instructions to be sent by the given data source; and 2) computing the decision rule so as to reach or stay below the order level.

The invention comprises, upon the updated value of the statistical indicator differing from the target value of the statistical indicator, computing an updated value of the order level based on the product of a current value of the order level with an exponential function of a difference between the target value of the statistical indicator and the updated value of the statistical indicator, and re-computing the decision rule so as to reach the updated value of the order level.

The invention comprises periodically gathering the updated values of the statistical indicator at regular intervals of a length under 5 minutes.

A computer program product stored in non-transitory computer-readable medium and comprising instructions adapted to perform the method of the invention The invention comprises plural data sources accessible for retrieving data to be used for the computation inquiry and a network for bilateral communication between the computer backend machine and the plural data source.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent processes or algorithms and data representations may be attempted by those skilled in the art. Further, the various names used for the different elements, functions and algorithms (e.g., etc.) are merely descriptive and are not intended to be read in a limiting sense, as these various elements, functions and algorithms can be referred to by any suitable names. All such and similar modifications of the teachings of this invention will still fall within the scope of the embodiments of this invention.

Furthermore, while described above primarily in the context of travel solutions provided by airlines (air carriers), those skilled in the art should appreciate that the embodiments of this invention are not limited for use only with airlines, but could be adapted as well for use with other types of travel modalities and travel providers including, as non-limiting examples, providers of travel by ship, train, motorcar, bus and travel products such as hotels.

Furthermore, some of the features of the exemplary embodiments of the present invention may be used to advantage without the corresponding use of other features. As such, the foregoing description should be considered as merely illustrative of the principles, teachings and embodiments of this invention, and not in limitation thereof.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

The program code embodying the software program instructions of various exemplary embodiments described herein is capable of being distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit and the scope of the embodiments of the invention.

What is claimed is:

1. A method for controlling the execution of a decision process by a computer backend machine of a computer network upon receipt of a computation inquiry, comprising:
    associating, to the computer backend machine, a configuration file containing at least one decision rule that drives the decision process and that is computed based at least in part on a current value of a statistical indicator and a target value of the statistical indicator;
    periodically obtaining an updated value of the statistical indicator;
    in response to the updated value differing from the target value, dynamically updating the configuration file, which further comprises:
        re-computing the at least one decision rule by setting the current value equal to the updated value; and
        storing in real-time the re-computed at least one decision rule in the configuration file,
    wherein the at least one decision rule comprises a data source selection rule providing a logic configuration to determine a data source among a plurality of data sources accessible for retrieving data to be used for the computation inquiry.

2. The method of claim 1 further comprising:
    using the configuration file for a particular computation inquiry received by the computer backend machine independently from the updating of the configuration file.

3. The method of claim 1 wherein the data source selection rule is a function of at least one characteristic of the computation inquiry.

4. The method of claim 1 wherein the computation inquiry is a flight availability computation inquiry, wherein the data source selection rule is an availability data source selection rule, and wherein the plurality of data sources comprises: a polling source, an availability status source, an availability cache source, or a combination thereof.

5. The method of claim 4 wherein the plurality of data sources comprise at least one polling source selected among a dynamic availability polling source, a direct access polling source, and an availability calculator source, and further comprising:
    using, as the statistical indicator for determining the availability data source selection rule, a ratio between a number of failures in retrieving data from the polling source and a total number of access attempts to said polling source.

6. The method of claim 4 wherein the plurality of data sources comprise a dynamic polling source, a direct access polling source, an availability calculator source, or a combination thereof, and further comprising:
    using, as the statistical indicator for determining the availability data source selection rule, a look-to-book ratio of an originator of the computation inquiry.

7. The method of claim 4 wherein the at least one decision rule comprises a cache writing decision rule providing a logic of whether to write in an availability cache source a replication of data obtained from a remote data source.

8. The method of claim 7 wherein the cache writing decision rule is a function of at least one characteristic of the computation inquiry.

9. The method of claim 7 further comprising:
    using a number of cache writings as the statistical indicator for determining the cache writing decision rule.

10. The method of claim 1 wherein periodically obtaining the updated value of the statistical indicator is operated at regular intervals of a length under five minutes.

11. A computer program product stored in a memory and comprising instructions adapted to perform the method of claim 1.

12. A method for controlling the execution of a decision process by a computer backend machine of a computer network upon receipt of a computation inquiry, comprising:
    associating, to the computer backend machine, a configuration file containing at least one decision rule that drives the decision process and that is computed based at least in part on a current value of a statistical indicator and a target value of the statistical indicator;
    periodically obtaining an updated value of the statistical indicator;

in response to the updated value differing from the target value, dynamically updating the configuration file, which further comprises:
   re-computing the at least one decision rule by setting the current value equal to the updated value; and
   storing in real-time the re-computed at least one decision rule in the configuration file,
wherein the computation inquiry requires the execution of a data read or write instruction in a data source, and the decision process determines whether a given data source is to be accessed by the computer backend machine for the execution of the data read or write instruction.

13. The method of claim 12 further comprising:
   defining an order level of read or write instructions to be executed by the given data source; and
   re-computing the at least one decision rule so as to reach or stay below the order level.

14. The method of claim 13 further comprising:
   upon the updated value of the statistical indicator differing from the target value of the statistical indicator, computing an updated value of the order level based on the product of a current value of the order level with an exponential function of a difference between the target value of the statistical indicator and the updated value of the statistical indicator; and
   re-computing the at least one decision rule so as to reach the updated value of the order level.

15. A computerized system comprising at least one computer backend machine conured to execute a decision process upon receipt of a computation inquiry and comprising a configuration file containing at least one decision rule that drives the decision process and that is computed based at least in part on a current value of a statistical indicator and a target value of the statistical indicator, the computerized system comprising a processor where operation of the processor in accordance with a computer program stored in a memory causes the computerized system to:
   periodically obtain an updated value of the statistical indicator;
   upon detection that the updated value is differing from the target value, dynamically update the configuration file, which further comprises:
   re-computing the at least one decision rule using the updated value as the new current value; and
   storing in real-time the re-computed at least one decision rule in the configuration file,
   wherein the at least one decision rule comprises a data source selection rule providing a logic conured to determine a data source among a plurality of data sources accessible for retrieving data to be used for the computation inquiry.

16. The computerized system of claim 15 further comprising:
   a plurality of data sources accessible for retrieving data to be used for the computation inquiry; and
   a network for bilateral communication between the computer backend machine and the plurality of data sources.

17. The computerized system of claim 15 wherein operation of the processor in accordance with the computer program stored in the memory causes the computerized system to:
   use the configuration file for a particular computation inquiry received by the computer backend machine independently from the updating of the configuration file.

18. The computerized system of claim 15 wherein the data source selection rule is a function of at least one characteristic of the computation inquiry.

19. The computerized system of claim 15 wherein the computation inquiry is a flight availability computation inquiry, the data source selection rule is an availability data source selection rule, and the plurality of data sources comprises: a polling source, an availability status source, an availability cache source, or a combination thereof.

20. The computerized system of claim 15 wherein periodically obtaining the updated value of the statistical indicator is conducted at regular intervals of a length under five minutes.

21. The computerized system of claim 19 wherein the plurality of data sources comprise at least one polling source selected among a dynamic availability polling source, a direct access polling source, and an availability calculator source, and operation of the processor in accordance with the computer program stored in the memory causes the computerized system to:
   use, as the statistical indicator for determining the availability data source selection rule, a ratio between a number of failures in retrieving data from the polling source and a total number of access attempts to said polling source.

22. The computerized system of claim 19 wherein the plurality of data sources comprise at least one polling source selected among a dynamic availability polling source, a direct access polling source, and an availability calculator source, and operation of the processor in accordance with the computer program stored in the memory causes the computerized system to:
   use, as the statistical indicator for determining the availability data source selection rule, a look-to-book ratio of an originator of the computation inquiry.

23. The computerized system of claim 19 wherein the at least one decision rule comprises a cache writing decision rule providing a logic of whether to write in an availability cache source a replication of data obtained from a remote data source.

24. The computerized system of claim 23 wherein the cache writing decision rule is a function of at least one characteristic of the computation inquiry.

25. The computerized system of claim 23 wherein operation of the processor in accordance with the computer program stored in the memory causes the computerized system to:
   use a number of cache writings as the statistical indicator for determining the cache writing decision rule.

26. A computerized system comprising at least one computer backend machine conured to execute a decision process upon receipt of a computation inquiry and comprising a configuration file containing at least one decision rule that drives the decision process and that is computed based at least in part on a current value of a statistical indicator and a target value of the statistical indicator, the computerized system comprising a processor where operation of the processor in accordance with a computer program stored in a memory causes the computerized system to:
   periodically obtain an updated value of the statistical indicator;
   upon detection that the updated value is differing from the target value, dynamically update the configuration file, which further comprises:
   re-computing the at least one decision rule using the updated value as the new current value; and
   storing in real-time the re-computed at least one decision rule in the configuration file, wherein the computation inquiry requires the execution of a data read or write instruction in a data source, and the decision process determines whether a given data source is to be accessed by the computer backend machine for the execution of the data read or write instruction.

27. The methed computerized system of claim 26 wherein operation of the processor in accordance with the computer program stored in the memory causes the computerized system to:
 define an order level of read or write instructions to be executed by the given data source;
 compute the at least one decision rule so as to reach or stay below the order level.

28. A computerized system comprising at least one computer backend machine configured to execute a decision process upon receipt of a computation inquiry and comprising a configuration file containing at least one decision rule that drives the decision process and that is computed based at least in part on a current value of a statistical indicator and a target value of the statistical indicator, the computerized system comprising a processor where operation of the processor in accordance with a computer program stored in a memory causes the computerized system to:
 periodically obtain an updated value of the statistical indicator;
 upon detection that the updated value is differing from the target value, dynamically update the configuration file, which further comprises:
 re-computing the at least one decision rule using the updated value as the new current value; and
 storing in real-time the re-computed at least one decision rule in the configuration file,
 wherein the at least one decision rule comprises a cache writing decision rule providing a logic of whether to write in an availability cache source a replication of data obtained from a remote data source.

29. The computerized system of claim 28 wherein operation of the processor in accordance with the computer program stored in the memory causes the computerized system to:
 use a number of cache writings as the statistical indicator for determining the cache writing decision rule.

\* \* \* \* \*